United States Patent [19]

Ikegaya

[11] Patent Number: 5,398,134
[45] Date of Patent: Mar. 14, 1995

[54] DISPLAYING APPARATUS FOR VEHICLE
[75] Inventor: Tatsuo Ikegaya, Shizuoka, Japan
[73] Assignee: Yazaki Corporation, Tokyo, Japan
[21] Appl. No.: 23,393
[22] Filed: Feb. 26, 1993
[30] Foreign Application Priority Data Feb. 28, 1992 [JP] Japan .................... 4-009750 U

[51] Int. Cl.⁶ .............................................. B60K 35/00
[52] U.S. Cl. ...................................... 359/630; 359/631; 359/634; 359/608; 359/885
[58] Field of Search ................ 359/69, 618, 630, 631, 359/634, 608, 885

[56] References Cited
U.S. PATENT DOCUMENTS 5,048,927  9/1991  Inoue et al. ...................... 359/618
5,157,549  10/1992  Suzuki et al. .

FOREIGN PATENT DOCUMENTS 59-87515  4/1986  Japan .
60-171047  2/1987  Japan .
61-267457  5/1988  Japan .

Primary Examiner—Viet Q. Nguyen
Attorney, Agent, or Firm—Sughrue, Mion, Zinn, Macpeak & Seas

[57] ABSTRACT

A displaying apparatus for a vehicle in which a displaying device, for displaying various items such as a vehicle speed, an engine speed or the like, is disposed on the rear surface side of a semitransparent reflecting member arranged with an attitude oriented toward a driver's eye and a reflecting mirror is disposed at the position located opposite to the displaying device while the reflecting member is interposed therebetween so that virtual images appearing on the reflecting surface of the semitransparent reflecting member are visually recognized by a driver through a front glass. The reflecting member or reflecting mirror has wavelength selectivity which allows high reflectance only within the wavelength range defined for a color of displaying light emitted from a displaying device. Alternatively, the front glass has wavelength selectivity which allows high transmittance only within the wavelength range defined for the color of the displaying light emitted from the displaying device.

1 Claim, 3 Drawing Sheets

DISPLAYING APPARATUS FOR VEHICLE

BACKGROUND OF THE INVENTION

The present invention relates generally to a displaying apparatus for a vehicle. More particularly, the present invention relates to a displaying apparatus for a vehicle wherein a displaying device is disposed on the rear surface side of a semitransparent reflecting member for displaying items such as a vehicle speed, an engine speed or the like, the reflecting surface of the reflecting member being oriented toward a driver who visually observes the foregoing items with his eyes, and a reflective mirror is disposed at the position located opposite to the displaying device while the semitransparent reflecting member is interposed therebetween.

A displaying apparatus of the foregoing type as illustrated in FIGS. 3 and 4 has been hitherto used. In the drawings, reference numeral 1 designates a case which is accommodated in an instrument panel. A half mirror 2 serving as a semitransparent reflecting member is arranged in the case 1 with such an attitude that a reflecting surface 2a of the half mirror 2 is oriented toward an eye point E of a driver who visually observes items appearing on the reflecting surface 2a of the half mirror 2. A display device 3 for displaying various items such as a vehicle speed, an engine speed or the like is disposed on the rear surface side of the half mirror 2, and a concave mirror 4 is disposed at the position located opposite to the displaying device 3 while the half mirror 2 is interposed therebetween. In addition, a front glass 5 molded of a transparent material such as an acrylic resin or the like is fitted to the case 1 so as to protect an opening portion 1a of the case 1 from damage, injury or the like by closing the opening portion 1a with the front glass 5.

In FIG. 3, reference numeral 6 designates a meter hood molded integral with the instrument panel, and reference numeral 7 designates a warning displaying unit. Items appearing on the warning displaying unit 7 can visually be recognized by driver's eyes through the front glass 5. The displaying device 3 is disposed at the position where its displaying surface is located substantially at a focus of the concave mirror 4 in order to assure that the items appearing on the displaying surface of the displaying device 3 are visually observed on the reflecting surface 2a of the half mirror 2 in an enlarged scale by driver's eyes.

Displaying light emitted from the displaying device 3 permeates through the half mirror 2 to reach the concave mirror 4 which in turn reflects the displaying light toward the half mirror 2. Subsequently, the displaying light deflected at the reflecting surface 2a of the half mirror 2 is irradiated toward the driver's eye point E so that virtual images corresponding to items on the displaying surface of the displaying device 3 are visually recognized by drivers's eyes within the displaying range of the reflecting surface 2a of the half mirror 2 when a driver visually observes the reflecting surface 2a of the half mirror 2 with his eyes. At this time, the items appearing on the reflecting surface 2a of the half mirror 2 can visually be recognized by driver's eyes from a remote location in an enlarged scale with the aid of the concave mirror 4 and the half mirror 2 both of which serve to repeatedly reflect displaying light while exhibiting an enlarging activity.

With the displaying apparatus constructed in the above-described manner, however, when exterior light is irradiated to the displaying apparatus from the eye point E side, there arises a problem that the exterior light permeates through the front glass 5 and reaches the half mirror 2, and subsequently, it is sequentially reflected via the half mirror 2, the concave mirror 4 and the half mirror 2 to return to the driver's eye point E as shown in FIG. 5, causing driver's visual observation to be disturbed by the exterior light.

To cope with the foregoing problem, a measure of reducing permeability of the front glass 5 has been hitherto taken for the purpose of preventing driver's visual observation from being disturbed by exterior light. However, in case that the front glass 5 has flat spectroscopic properties and the permeability of the front glass 5 is reduced at an average rate for all wavelengths of the exterior light, there arises another problem that brightness of each virtual image to be visually recognized by driver' eyes can not sufficiently be maintained with the displaying apparatus.

SUMMARY OF THE INVENTION

The present invention has been made in consideration of the aforementioned problems and its object resides in providing a displaying apparatus for a vehicle wherein when exterior light is irradiated to the displaying apparatus, there does not arise a malfunction that driver's visual observation is disturbed by the exterior light.

To accomplish the above object, according to one aspect of the present invention, there is provided a displaying apparatus for a vehicle wherein a semitransparent reflecting member is disposed with such an attitude that items appearing on a reflecting surface of the semitransparent reflecting member to be visually recognized by driver's eyes are oriented toward a driver's eye point, a displaying device for displaying various items such as a vehicle speed, an engine speed or the like is disposed on the rear surface side of the semitransparent reflecting member, and a concave mirror is disposed at the position located opposite to the displaying device while the semitransparent reflecting member is interposed therebetween so that virtual images derived from reflection of displaying light emitted from the displaying device are visually recognized by the driver's eyes through a front glass, wherein the displaying apparatus is characterized in that the semitransparent reflecting member has wavelength selectivity which allows high reflectance to be exhibited only within the wavelength range defined for a color of the displaying light emitted from the displaying device.

In addition, a characterizing feature of the displaying apparatus for a vehicle constructed according to other aspect of the present invention consists in that the front glass has wavelength selectivity which allows high permeability to be exhibited only within the wavelength range defined for a color of the displaying light emitted from the displaying device.

Further, a characterizing feature of the displaying apparatus for a vehicle constructed according to another aspect of the present invention consists in that the reflecting mirror has wavelength selectivity which allows high reflectance to be exhibited only within the wavelength range defined for a color of the displaying light emitted from the displaying device.

With the displaying apparatus constructed in the above-described manner, since the semitransparent reflecting member has wavelength selectivity which allows high reflectance to be exhibited only within the wavelength range defined for the color of the displaying light emitted from the displaying device, when exterior light is irradiated to the displaying apparatus through the front glass, only a light component of the displaying light having a wavelength range corresponding to the color of the displaying light emitted from the displaying device is reflected from the reflecting surface of the semitransparent reflecting member and other light component rather than the foregoing one is substantially eliminated without any reflection therefrom.

In addition, since the front glass has wavelength selectivity which allows high permeability to be exhibited only within the wavelength range defined for the color of the displaying light emitted from the displaying device, when exterior light is irradiated to the displaying apparatus through the front glass, only a light component of the displaying light having a wavelength range corresponding to the color of the displaying light emitted from the displaying device is caused to permeate through the front glass and other light component rather than the foregoing one is substantially eliminated without any permeation therethrough.

Further, since the reflective mirror has wavelength selectivity which allows high reflectance to be exhibited only within the wavelength range defined for the color of the displaying light emitted from the displaying device, when exterior light is irradiated to the displaying apparatus through the front glass, only a light component of the displaying light reflected at the reflective surface of the semitransparent reflecting member while having a wavelength corresponding to the color of the displaying light emitted from the displaying device is reflected therefrom and other light component rather than the foregoing one is substantially eliminated without any reflection therefrom.

DESCRIPTION OF THE PREFERRED EMBODIMENTS

Figure 3:
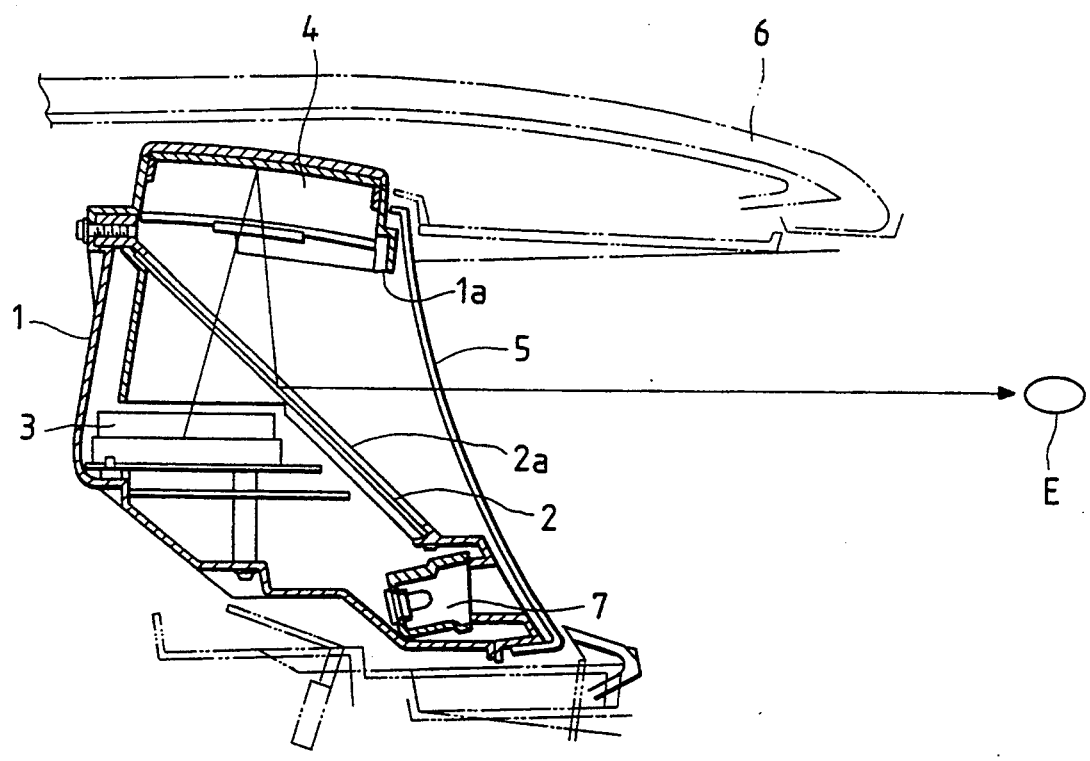
FIG. 3 shows by way of sectional view the structure of a conventional displaying apparatus for a vehicle.

The present invention will now be described in detail with reference to the accompanying drawings. It should be noted that the structure of a displaying apparatus for a vehicle constructed according to the present invention is substantially identical with that of the conventional displaying apparatus which has been described above with reference to FIG. 3.

Figure 1A:
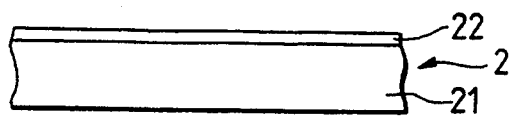
FIG. 1 is a fragmentary sectional view of a displaying device for a vehicle constructed according to the present invention, particularly showing the structure of a half mirror, a front glass and a concave reflecting mirror.
Figure 1B:
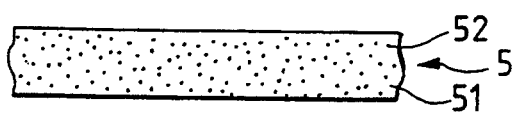

Specifically, according to a first embodiment of the present invention, the displaying apparatus includes a half mirror having wavelength selectivity which allows high reflectance to be exhibited only within the wavelength range defined for a color of displaying light emitted from a displaying device. This half mirror designated by reference numeral 2 is formed by employing a coating process in such a manner that a semitransparent reflecting film 22 having wavelength selectivity is deposited on the surface of a substrate 21 for the half mirror 2 as shown in FIG. 1(a). The semitransparent reflecting film 22 can be formed by using a hologram film, a deposited metallic film or the like each having wavelength selectivity.

Figure 2A:
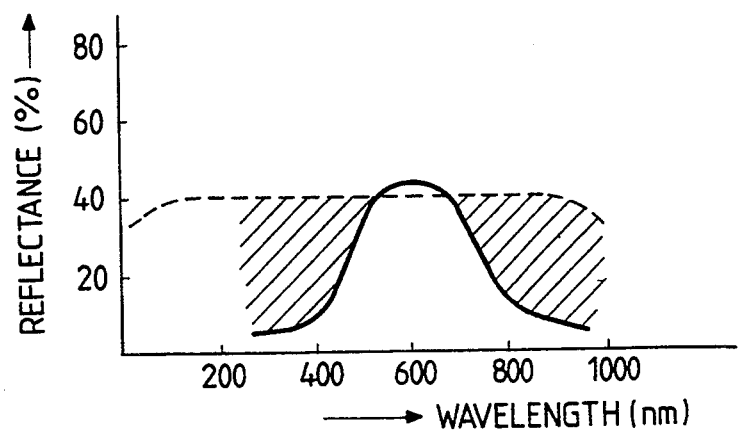
FIG. 2 shows by way of graphs wavelength selectivity of the half mirror, the front glass and the concave reflecting mirror shown in FIG. 1 each of which is used for constituting the displaying apparatus.

FIG. 2(a) is a graph which shows a property of reflectance of the half mirror 2 for the displaying apparatus of the present invention in comparison with that of the conventional displaying apparatus. Since the conventional displaying apparatus represented by a dotted line exhibits a flat property of reflectance within the whole wavelength range, most of exterior light irradiated to the displaying apparatus is reflected therefrom. On the contrary, when exterior light is irradiated to the displaying apparatus of the present invention as represented by a solid line, only a specific light component corresponding to a color of displaying light emitted from a displaying device is reflected by the half mirror 2, and a large part of light energy given by the exterior light is substantially eliminated by the half mirror 2. Consequently, the displaying apparatus of the present invention can prevent driver's visual observation from being disturbed by the exterior light without reduction of brightness of each item displayed by the displaying apparatus.

According to a second embodiment of the present invention, the displaying apparatus includes a front glass having wavelength selectivity which allows high transmittance to be exhibited only within the wavelength range defined for the color of the displaying light emitted from the displaying device. This front glass designated by reference numeral 5 can be obtained by mixing a transparent synthetic resin 51 for the front glass 5 with a special pigment 52 as shown in FIG. 2(a).

Figure 2B:
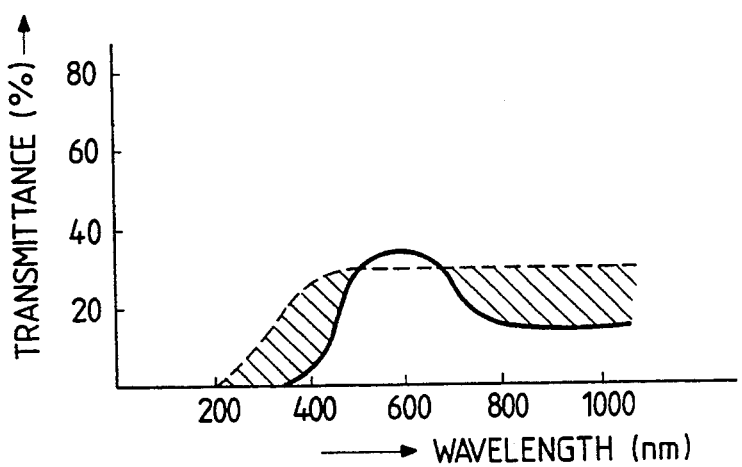

FIG. 2(b) is a graph which shows a property of transmittance of the front glass 5 for the displaying apparatus in comparison with that of the conventional displaying apparatus. Since the conventional displaying apparatus represented by a dotted line exhibits a flat property of transmittance within the wide wavelength range, most of exterior light irradiated to the conventional displaying apparatus is caused to permeate through the front glass 5. On the contrary, when exterior light is irradiated to the displaying apparatus of the present invention as represented by a solid line, only a specific light component corresponding to the color of the displaying light emitted from the displaying device is caused to permeate through the front glass 5, and a large part of the light energy given by the exterior light is substantially eliminated by the front glass 5. Consequently, the displaying apparatus of the present invention can prevent driver's visual observation from being disturbed by the exterior light without reduction of brightness of each item displayed by the displaying apparatus.

Figure 1C:
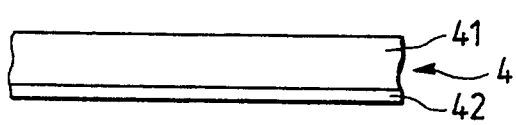

According to a third embodiment of the present invention, the displaying apparatus includes a concave mirror 4 having wavelength selectivity which allows high reflectance to be exhibited only within the wavelength range defined for the color of the displaying light emitted from the displaying device. The concave mirror 4 is prepared by employing a coating process in such a manner that a reflecting film 42 having wavelength selectivity is deposited on the surface of a substrate 41 for the concave mirror 4 as shown in FIG. 1(c). The reflecting film 42 can be formed by using a hologram film, a deposited metallic film or the like each having wavelength selectivity.

Figure 2C:
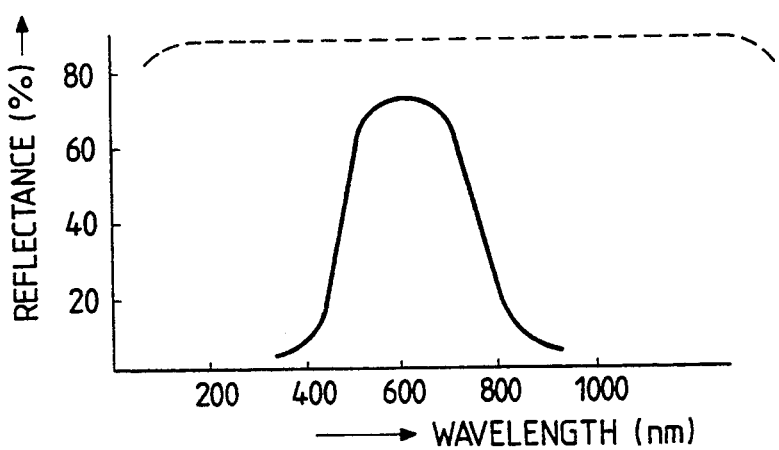
Figure 4:
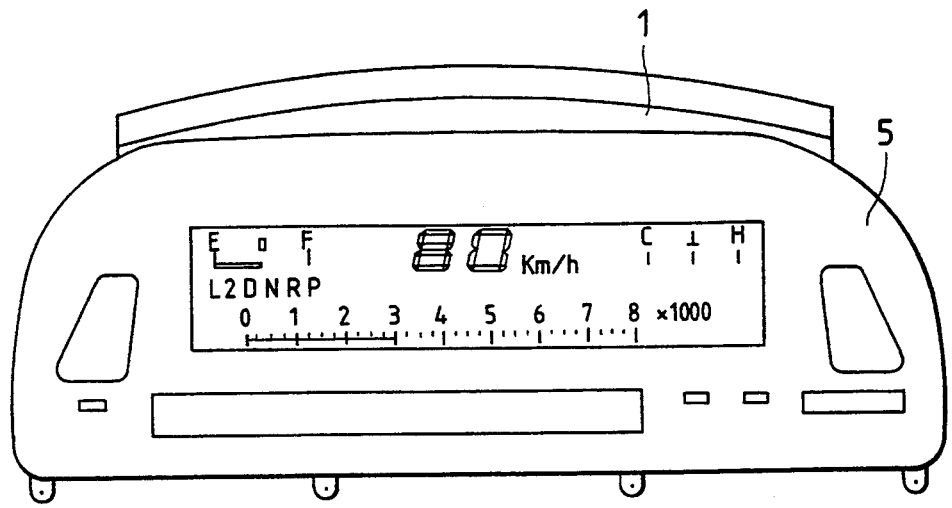
FIG. 4 is a front view of the conventional displaying apparatus shown in FIG. 3.
Figure 5:
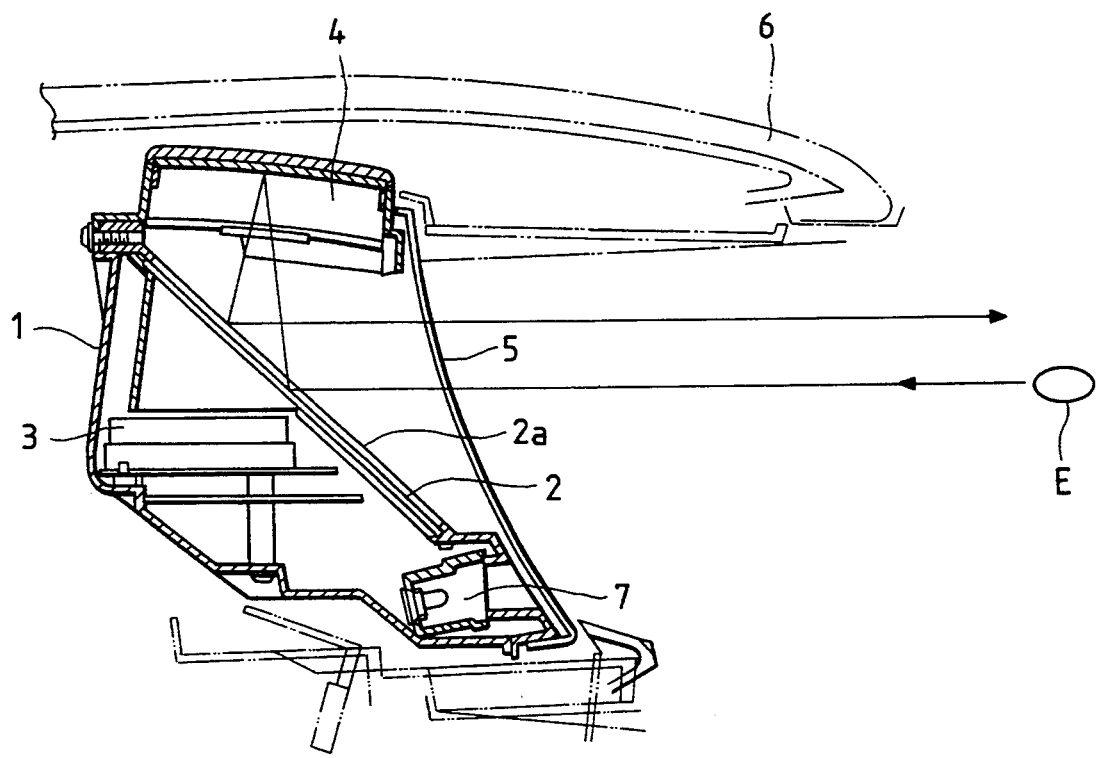
FIG. 5 is a sectional view of the conventional displaying apparatus similar to FIG. 3, particularly illustrating problems inherent to the conventional displaying apparatus.

FIG. 2(c) is a graph which shows a property of reflectance of the concave mirror 4 in comparison with that of the conventional displaying apparatus. Since the conventional displaying apparatus as represented by a dotted line exhibits a flat property of reflectance within the whole wavelength range, all exterior light irradiated to the conventional displaying apparatus is reflected by the concave mirror 4. On the contrary, when exterior light is irradiated to the displaying apparatus of the present invention as represented by a solid line, only a specific light component corresponding to the color of the displaying light emitted from the displaying device is reflected by the concave mirror 4, and a large part of the light energy given by the exterior light is substantially eliminated by the concave mirror 4. Consequently, the displaying apparatus can prevent driver's visual observation from being disturbed by the exterior light without reduction of brightness of each item displayed by the displaying apparatus.

As is apparent from the above description, according to the present invention, when exterior light is irradiated to the displaying apparatus through the front glass, only a light component of the exterior light corresponding to the wavelength range defined for the color of the displaying light emitted from the displaying device is reflected from the semitransparent reflecting member and other light component rather than the foregoing one is substantially eliminated without any reflection therefrom. Consequently, the displaying apparatus can prevent driver's visual observation for virtual images displayed by the displaying device being disturbed by the exterior light while maintaining brightness of each virtual image on the reflecting surface of the semitransparent reflecting member.

In addition, when exterior light is irradiated to the displaying apparatus through the front glass, only a light component corresponding to the wavelength range defined for the color of the displaying light emitted from the displaying device is caused to permeate through the front glass and other component rather than the foregoing one is substantially eliminated without any permeation through the front glass. Further, when exterior light is irradiated to the displaying apparatus through the front glass and then reflected by the semitransparent reflecting member, only a light component of the exterior light corresponding to the wavelength range defined for a color of the displaying light emitted from the light displaying device is reflected by the concave mirror and other flight component of the exterior light rather than the foregoing one is substantially eliminated without any reflection therefrom. Consequently, the displaying apparatus can prevent driver's visual observation for virtual images appearing on the reflecting surface of the semitransparent reflecting member from being disturbed by the exterior light while maintaining brightness of each of the virtual images.

What is claimed is:

1. In a displaying apparatus for a vehicle wherein a semitransparent reflecting member is disposed so that items appearing on a reflecting surface of said semitransparent reflecting member to be visually recognized by driver's eyes are oriented toward a driver's eye point, a displaying device for displaying the items is disposed on the rear surface side of said semitransparent reflecting member, and a concave mirror is disposed at the position located opposite to said displaying device while said semitransparent reflecting member is interposed therebetween so that virtual images derived from reflection of displaying light emitted from said displaying device through said semitransparent reflecting member to display said items on said reflecting surface of said semitransparent reflecting member are visually recognized by driver's eyes through a front glass, said the improvement wherein said front glass has wavelength selectivity which allows high transmittance to be exhibited only within the wavelength range defined for a color of said displaying light emitted from said displaying device.

* * * * *